United States Patent [19]

Games

[11] 3,789,197

[45] Jan. 29, 1974

[54] ANALOG DIVIDER AND NAVIGATION COMPUTER

[75] Inventor: John E. Games, Granby, Conn.

[73] Assignee: United Aircraft Corporation, East Hartford, Conn.

[22] Filed: July 3, 1972

[21] Appl. No.: 268,256

[52] U.S. Cl. ............ 235/150.27, 235/183, 235/195, 244/77 B
[51] Int. Cl. ........ G06g 7/78, G06g 7/16, G06g 7/18
[58] Field of Search ....... 235/150.2, 150.22, 150.23, 235/150.26, 150.27, 194, 195, 196, 183; 244/77 R, 77 A, 77 B, 77 D; 328/127, 160, 161; 318/580, 583, 584

[56] References Cited
UNITED STATES PATENTS

| | | | |
|---|---|---|---|
| 3,705,306 | 12/1972 | Lydon et al. | 235/150.26 X |
| 3,638,092 | 1/1972 | Kammerer | 244/77 X |
| 3,619,579 | 11/1971 | Perkins | 235/150.2 |
| 3,383,501 | 5/1968 | Patchell | 235/195 |
| 3,502,983 | 3/1970 | Ingle et al. | 235/196 X |
| 3,633,854 | 1/1972 | Buchholz et al. | 244/770 |
| 3,665,465 | 5/1972 | Miller | 235/150.22 X |
| 3,443,073 | 5/1969 | Cohen | 235/150.2 |
| 3,649,818 | 3/1972 | Sylvander et al. | 235/150.27 |
| 3,521,046 | 7/1970 | Tippetts | 235/195 |
| 3,549,874 | 12/1970 | Vachitis | 235/195 X |

Primary Examiner—Joseph F. Ruggiero
Attorney, Agent, or Firm—Melvin Pearson Williams

[57] ABSTRACT

A voltage analog of a denominator is integrated for a period of time, and then the integrator is reset to zero, cyclically; the output of the integrator is compared with a voltage analog of a numerator, the output of the comparison comprising a pulsewidth modulated analog of the quotient; a DC analog of the quotient may be provided by filtering. In one specific embodiment, the numerator analog is proportional to the distance of an aircraft to a way point and the denominator analog is proportional to the ground speed of the aircraft toward the way point, the quotient being proportional to time-to-go to the way point. In another embodiment, the pulsewidth modulated quotient is used as a multiplier, to switch, and thereby provide pulsewidth modulation to, a DC voltage analog of a multiplicand. In another specific embodiment of a navigation computer, a command vertical speed signal is derived as the product of ground speed toward the way point and a quotient, the quotient being the difference between aircraft altitude and desired altitude at the selected way point divided by the horizontal distance to the way point. In a further specific embodiment, the difference between the rate of change of altitude and the command vertical speed is used as a vertical navigation indication.

4 Claims, 4 Drawing Figures

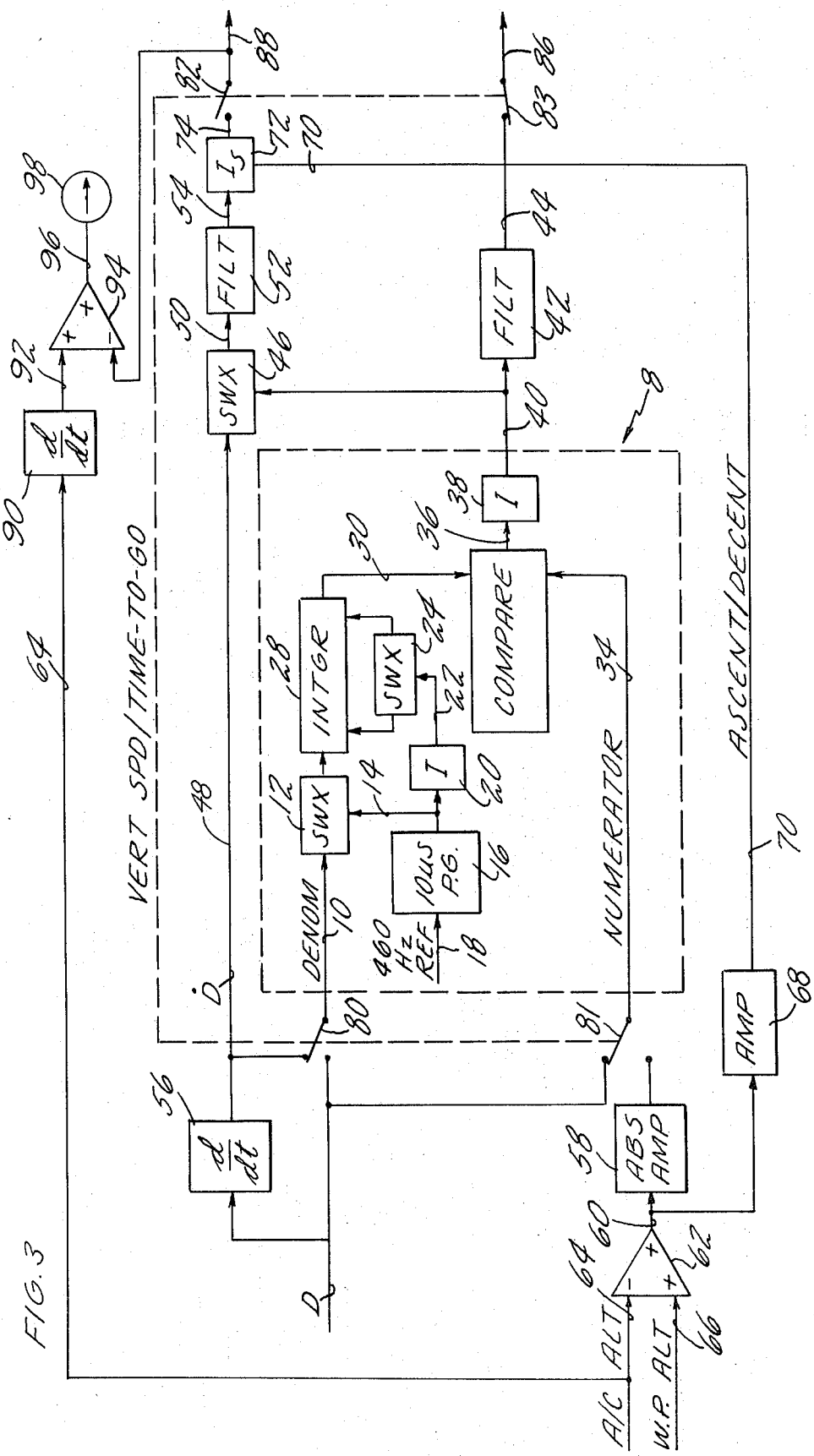

ANALOG DIVIDER AND NAVIGATION COMPUTER

BACKGROUND OF THE INVENTION

1. Field of the Invention

This invention relates to an improved analog divider and to navigation computers employing the same.

2. Description of the Prior Art

Electronic navigation computers, such as those used for assisting in the navigation of aircraft, employ many different types of circuitry and apparatus to perform different trigonometric and algebraic functions. In order to divide one quantity by another, it has been common to use analog dividers which comprise analog multipliers in a feedback loop. However, as is known, analog multipliers leave much to be desired. First, some analog multipliers provide only an approximate solution, not an exact solution; one such multiplier is the well known square law multiplier. On the other hand, other multipliers, such as the transconductance multiplier, have a very limited range; typically for input value ratios of 10 to 1 the multiplier may have an accuracy of only 1 percent to 5 percent of point. As the range of input values increases to 50 to 1 the accuracy may degrade to only 25 percent of point or more. Variations in characteristics of analog dividers employing analog multipliers are liable to be very sensitive to temperature. Offset errors, such as DC drift, are also significant in analog dividers known to the prior art.

Another factor which is significant in considering the implementation of an analog divider is the ability of the divider to work in conjunction with other circuitry. For instance, as is disclosed in a commonly owned copending application of L. D. Brock, Ser. No. 268,254, filed July 3, 1972 entitled VERTICAL SPEED COMMAND FOR AIR NAVIGATION, filed on even date herewith, it may be necessary for a quotient developed by an analog divider to be utilized in an analog multiplier.

SUMMARY OF INVENTION

A primary object of the present invention is to provide an improved analog divider.

Another object of the invention is to provide an analog divider having the quotient developed in a form which is readily utilized as one input to a simple analog multiplier, for multiplication or division thereof.

In accordance with the invention, a voltage analog of a denominator is integrated for a period of time after which the integrator is reset, cyclically, the integrator output being continuously compared with a voltage analog of a numerator, the output of the comparison providing a pulsewidth modulated indication of a quotient. In further accord with the present invention, the pulsewidth modulation indication of the quotient may be filtered so as to provide a DC indication. Or, a pulsewidth modulation indication of the quotient may be utilized to activate a switch, another input of which is a DC signal having a magnitude equal to a value to be multiplied by said quotient to provide a product. In still further accord with the present invention, the output of the switch may be filtered so as to provide a DC value indicative of the product of one value with the quotient of two other values. In still further accord with the present invention, the sense of one of the values formed in the product may be utilized to provide inversion of the product or not, so as to maintain a product of a correct sense.

The present invention greatly simplifies the ability to perform algebraic functions in an analog fashion. The present invention may be readily implemented utilizing state of the art components and technology.

The present invention provides an exact solution rather than an approximate solution, and since the integration involved can be performed with an operational amplifier strapped with a capacitor, which is basically a balanced configuration, errors and sensitivity to temperature changes are greatly minimized. The present invention can operate to accuracies of 5 percent to 10 percent of point even with ranges as high as 250 to 1 in the magnitudes of the input variables.

In accordance with other objects of the invention, a divider provides a quotient proportional to the horizontal distance of an aircraft to a way point divided by the derivative thereof, said quotient being proportional to the time to go, e.g., the time it will take the aircraft to reach the selected way point. In accordance with still further objects of the present invention the derivative of the aircraft altitude is compared with a command vertical speed indication so as to provide an indication of how closely the aircraft is being maneuvered to follow the command vertical speed indication. These apsects of the invention may be performed by digital means if desired.

The present invention also provides novel and improved indications of vertical navigation of an aircraft.

Other objects, features and advantages of the present invention will become more apparent in the light of the following detailed description of preferred embodiments thereof, as illustrated in the accompanying drawing.

BRIEF DESCRIPTION OF THE DRAWING

FIG. 3 is a schematic block diagram of a utilization of the invention incorporating a pulsewidth modulated quotient utilized to operate a multiplying switch and vertical navigation function of the invention.

DESCRIPTION OF THE PREFERRED EMBODIMENT

Figure 1:
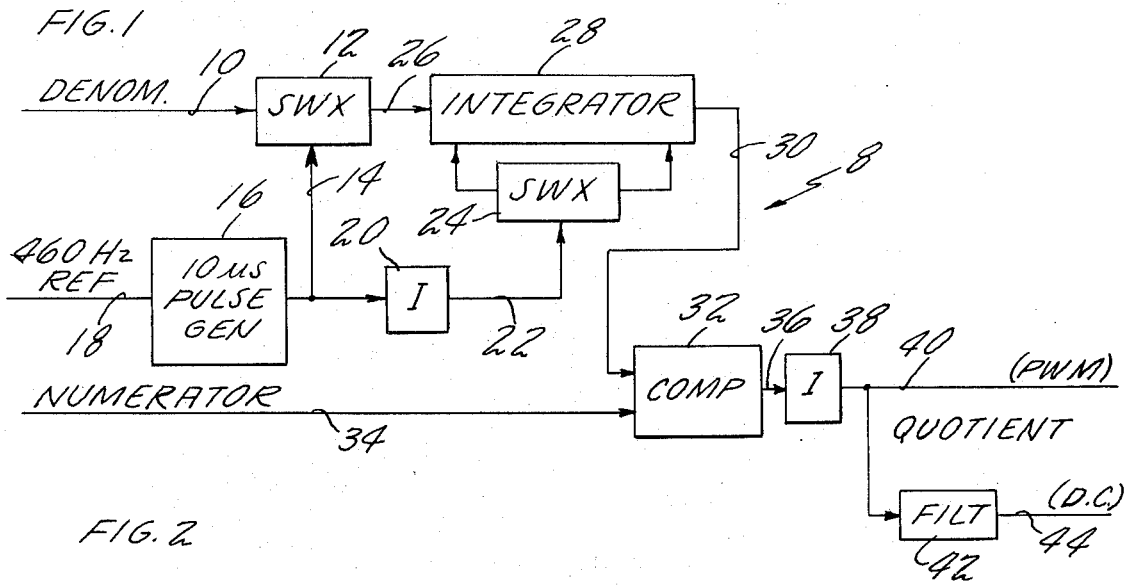
FIG. 1 is a simplified schematic block diagram of an analog divider in accordance with the present invention.

Referring now to an embodiment of a divider 8 in accordance with the invention as shown in FIG. 1, a voltage analog of a denominator is applied on a signal line 10 to a switch 12 the other input of which is a cyclic pulse applied over a line 14 from a 10 microsecond pulse generator 16 which in turn is responsive to 460 Hz reference signal on the signal line 18. The 10 microsecond pulse generator may simply comprise a monostable multivibrator, or it may comprise a flip flop and associated logic together with a 100 KHz signal source, synchronized to the 460 Hz reference, so as to generate a 10 microsecond pulse once in each period of the 460 Hz reference. The 460 Hz reference is arbitrary, and any other suitable reference may be chosen. Similarly, the 10 microsecond pulsewidth is arbitrary and other pulsewidths may be chosen. However, as is apparent from the detailed description hereinafter, it is well to choose a pulse width which is very small in contrast with the period of the reference signal so that variations in the pulsewidth become immaterial in the operation of the device. The signal on the line 14 is applied to an inverter 20 the output of which on a line 22 operates another switch 24 such that the switch 24 is closed when the switch 12 is open and vice versa. The output of the switch 12 is applied over a signal line 26 to an integrating circuit 28 which may preferably comprise an operational amplifier with capacitor feedback as is well known in the art. The switch 24 is applied to the integrator 28 in such a fashion as to reset the integrator whenever the switch 24 is operated. The switch 24 may, for instance, be connected directly across the feedback capacitor so as to short circuit it whenever the switch 24 is operated.

Figure 2:
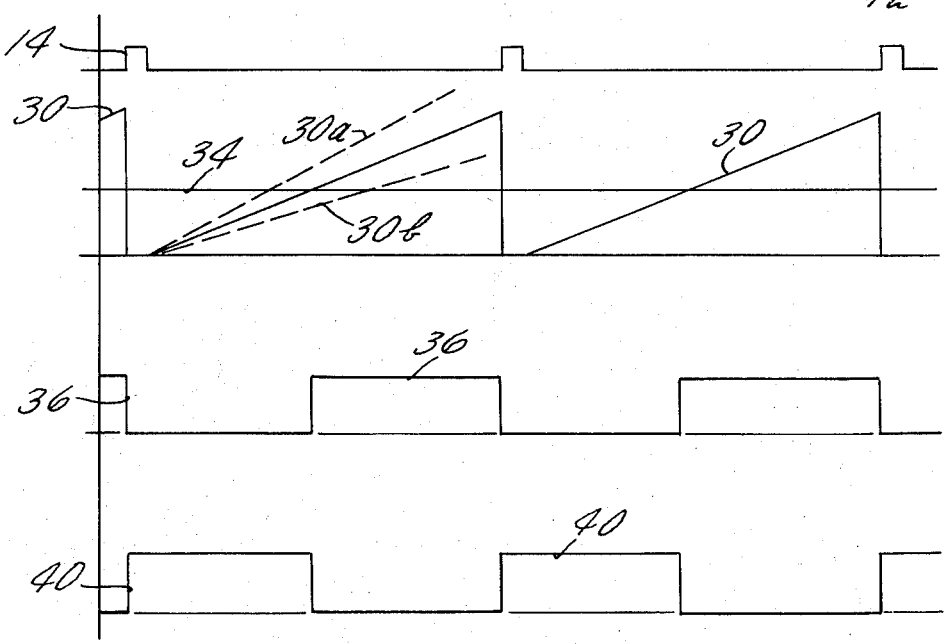
FIG. 2 is a diagram illustrative of voltage waveforms relating to the embodiment of FIG. 1, on a common time base.

In the present instance, the switches 12, 24 may preferably comprise field effect transistors, and it is assumed that during the 10 microsecond pulse on the line 14 the switch 12 will be open so that the signal on the line 10 does not pass through to the line 26; similarly in the absence of the signal on the line 14, the switch 24 will be open so that it does not short circuit the capacitor (or otherwise cause resetting) of the integrator 28. Of course, other forms of switches such as diode quads may be used as desired when appropriate. With the switches 12, 24 operating as described, the integrator 28 will be connected to the signal line 10 for substantially all of each 460 Hz reference signal period, and the switch 24 will be open during this period of time. Thus the integrator 28 will integrate the voltage applied on the signal line 10 through substantially the entire period. However, once in each period when the 10 microsecond pulse generator 16 provides a pulse on the line 14, the switch 12 will disconnect the denominator signal on the line 10 from the integrator 28, and the signal on the line 22 will cause the switch 24 to reset the integrator (such as by short circuiting the capacitor thereof). This provides a ramp voltage on a signal line 30 at the output of the integrator 28, as is illustrated in FIG. 2. The slope of the ramp voltage on the line 30 at the output of the integrator 28 will necessarily depend on the magnitude of the denominator analog voltage on the signal line 10. Thus if the denominator analog is greater, the slope will be greater as is illustrated by the dotted line 30a; and if the denominator analog voltage is lesser, the slope will be lesser as indicated by the dotted line 30b.

The voltage on the line 30 is applied to a comparator 32 which also receives a voltage analog of a numerator on a signal line 34. The comparator will provide an output on a signal line 36 whenever the signal on the line 30 exceeds the signal on the line 34. Thus the output of the comparator 32 is a pulsewidth modulation indication of the quotient. However, this is in a sense negative in that the larger the quotient the smaller is the width of the pulse output. Therefore an inverter 38 is used to provide a signal on a line 40 which is a pulsewidth modulation indication of the quotient in the same sense as the quotient, as is also illustrated in FIG. 2. Then, if desired, the quotient signal on the line 40 may be passed through a suitable filter 42 so as to provide a DC indication of the quotient on the line 44.

Thus the present invention, utilizing relatively simple and readily available components, provides a very simple method of performing an analog division, and does so in a manner to provide a quotient which is pulsewidth modulated and is easily converted to DC to suit any given utilization thereof. The pulsewidth modulated indication of the quotient can be extremely useful in a case where the quotient is to be multiplied with another multiplicand. Such a case is disclosed and claimed in the aforementioned Brock patent application, as is shown herein for illustrative purposes in FIG. 3. In FIG. 3, the divider 8 of FIG. 1 is shown within the dashed lines. The output of the divider is applied to a switch 46 to cause the switch to operate and pass a signal on a line 48 to a line 50 in response to the presence of the signal on the line 40. If the signal on the line 48 comprises a DC voltage, the magnitude of which is indicative of the parameter represented thereby, this voltage is pulsewidth modulated by the switch 46 in response to the quotient on the line 40, and the average value of the output of the switch 46 on the line 50 will equal the product of the signals on the lines 48 and 40. This may be passed through a suitable filter 52 so as to provide a DC signal on a line 54 which is equal to the product of the signals on the lines 40 and 48. In the aforementioned Brock application, the denominator input signal on the line 10 is a voltage analog of the distance to a way point in an area navigation computer used for navigating aircraft. The signal on the line 10 is also passed through a differentiating device 56 so as to provide the rate of change of distance to way point ($\dot{D}$) which is equivalent of ground speed toward the way point. The numerator input on the line 34 is provided by an absolute amplifier 58 in response to a signal on a line 60 which comprises the difference between aircraft altitude and the altitude at which is desired to fly over the selected way point as developed by a difference amplifier 62 in response to a respective signals on lines 64 and 66. Dividing the difference in the present altitude from desired altitude by the distance to the way point at which the desired altitude is to be achieved porvides the tangent of the glide slope angle which must be achieved in order to reach the way point. Thus the signal on the line 40 is equivalent to the tangent of the desired glide slope angle. Multiplying ground speed toward the way point by the tangent of a desired glide slope angle provides, on the line 50, a signal indicative of a required vertical speed necessary to achieve the desired altitude at the selected way point. Since the way point altitude may be above or below the present aircraft altitude it has to be determined whether the aircraft is to climb or descend. For that purpose a low threshold high gain amplifier 68 provides an ascent/descent signal on a line 70 which has the same sense as the output of the amplifier 62. Thus if the output of the amplifier 62 is positive, the signal on the line 70 will be positive. This signal is applied to a selective inverter circuit 72 to provide a command vertical speed signal on a line 74 which is inverted from the signal on the line 54 when the aircraft is to descend, and not inverted when the aircraft is to climb.

Figure 4:
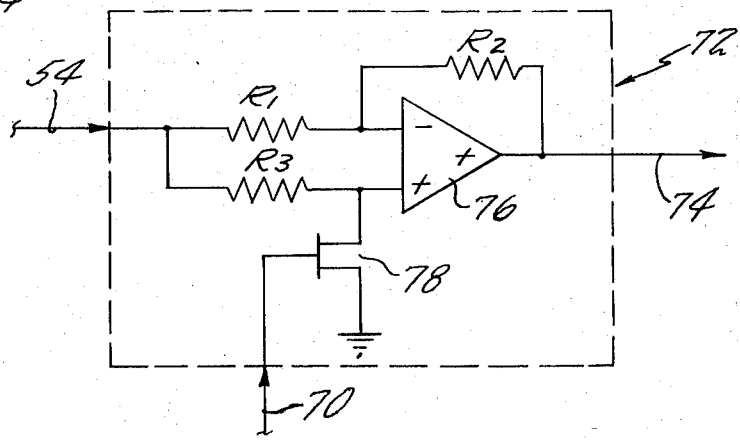
FIG. 4 is a schematic diagram of an invert/no-invert circuit for use in the embodiment of FIG. 3.

The selective inverter circuit 72 is illustrated in FIG. 4. It simply comprises an operational amplifier 76 with all three resistors R1, R2, R3, of equal magnitude. As is known, the gain of the noninverting output of an amplifier (through R3) is equal to 1 + R2/R1 whereas the gain of the inverting side is equal to −R2/R1. By making the resistors equal, the gain of the noninverting side is twice that of the inverting side. When the aircraft altitude is higher than the desired way point altitude, the output of the amplifier 62 (FIG. 3) is positive providing a positive signal on the line 70 to a field effect transistor 78. Assuming this to be an N-channel or N-junction transistor, the positive signal will cause the transistor 74 to operate, short circuiting the noninverting input leaving the inverting input operable so that the signal on the line 54 is inverted before being applied as an output signal on the line 74. On the other hand, when the desired way point altitude is higher than the aircraft altitude, the output of the difference amplifier 14 will be negative which will not cause operation of the transistor 74. This means that both the inverting and noninverting inputs of the amplifier are operable and since the noninverting input of the amplifier has twice the gain as the inverting input, the net effect is to not invert the signal on the line 54 before applying it to the line 74.

Thus the embodiment of FIG. 3 illustrates an important advantage of the analog divider of the present invention, and a further aspect of the present invention, which comprises providing a simple method of using a quotient as the multiplicand in the formulation of a product.

FIG. 3 also illustrates another aspect of the present invention, and a manner in which it may be utilized so as to provide a navigational function in accordance with another object of the invention. Specifically, a plurality of ganged switches 80-83 are provided so as to permit operation of the invention to provide a signal indicative of horizontal distance to the way point as just described, and as disclosed and claimed in the aforementioned Brock application, simply by having the switches 80-83 transferred to the position opposite to that shown in FIG. 3. On the other hand, with the switches in the position shown in FIG. 3, the denominator becomes the ground speed toward the way point and the numerator becomes the horizontal distance to the way point so that the DC quotient on the line 44 comprises the time to go to the way point, that is, the time it will take to reach the way point under current conditions. This is passed by the switch 83 to a line 86 and may be utilized as a momentary indication, if desired, by making the switches 80-83 spring returned. Notice that when the switches 80-83 are in the position shown, the signal on the line 74 will not be proportional to the horizontal distance to the way point so that the switch 82 prevents applying this as an output to a signal line 88.

Another aspect of the present invention includes the use of command vertical speed, as disclosed and claimed in the aforementioned Brock application, in a novel way. Specifically, the actual aircraft vertical speed is derived by applying the aircraft altitude signal on the line 64 to a differentiating circuit 90 so as to provide a signal on a line 92 equal to the actual vertical speed of the aircraft. With the ganged switches 80-83 transferred to the position opposite to that shown in FIG. 3, the signal on the line 88 will comprise the command vertical speed, that is the speed required to reach the selected way point at the desired altitude as described hereinbefore. By subtracting the command vertical speed from the actual vertical speed in a differencing circuit 94 there is provided, on a signal line 96, a signal proportional to the deviation of the actual speed from that required to reach the selected way point at the desired altitude. This may be applied to any suitable indicator 98 of a type known to the art as another indication to the pilot of the navigational performance of the craft in the vertical direction.

Although the invention has been shown and described with respect to preferred embodiments of various aspects thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. An analog divider comprising:
    a single integrator;
    a source of a voltage analog of a denominator;
    timing means for providing a cyclically repetitive sequence of first timing signals and including means for inverting said first timing signals to provide second timing signals interleaved with said first timing signals in said sequence, said sequence consisting of equal periods each including one of said first timing signals and one of said second timing signals;
    cyclically operable switch means responsive to said timing means for normally connecting, in response to said first timing signals, said denominator source to the input of said integrator so that said integrator will integrate said denominator voltage analog for a period of time, and for periodically disconnecting said integrator from said source and resetting said integrator to a zero integration value in response to said second timing signals, once in each period of said sequence;
    a source of a voltage analog of a numerator; and
    a comparator connected to the output of said integrator and to said numerator source, the output of said comparator comprising a pulsewidth modulated indication of the quotient of said numerator divided by said denominator.

2. Apparatus according to claim 1 further comprising:
    an inverter connected to the output of said comparator to provide a pulsewidth modulation indication of said quotient in the same sense as said quotient;
    an electronic switch having an input and an output and a control operable in response to a signal applied thereto to close and thereby connect said input with said output, said control being connected to the output of said inverter whereby in the presence of a signal from said inverter said switch will connect its input to its output;
    a source of a voltage analog of a multiplicand, said source being connected to the input of said switch, whereby the average value of the output of said switch is proportional to the product of said multiplicand and said quotient;
    a filter connected to the output of said switch, the output of said filter comprising a DC voltage the magnitude of which is proportional to the produce of said multiplicand with said quotient; and wherein: product
    said numerator comprises the difference between present aircraft altitude and the altitude at which it is desired to fly over a selected way point;

said denominator comprises the horizontal distance between said aircraft and said selected way point, whereby said quotient comprises the tangent of the flight path angle required to reach said selected way point at said desired altitude, said multiplicand comprises the ground speed of the aircraft toward said selected way point, so that said product represents vertical speed for the aircraft required to reach the selected way point at the desired altitude;

and additionally comprising:

means providing a signal representing the instantaneous vertical speed of the aircraft; and means subtracting said command vertical speed indication from said instantaneous vertical speed signal to provide an aircraft command signal.

3. Apparatus according to claim 2 and further comprising an indicator to provide a visual indication of said aircraft command signal.

4. An aircraft navigational computer comprising:

first means providing a signal indicative of the current horizontal distance of an aircraft from a selected way point;

differentiating means responsive to said first means for differentiating said horizontal distance signal and thereby providing a signal indicative of the time derivative of said horizontal distance signal; and means dividing said horizontal distance signal by said time derivative signal to provide a signal indicative of the time required for said aircraft to reach said selected way point from the current horizontal distance therefrom at the current ground speed thereto.

* * * * *